(12) United States Patent
Sander et al.

(10) Patent No.: US 11,530,632 B2
(45) Date of Patent: Dec. 20, 2022

(54) OIL FILTER FOR A MOTOR VEHICLE AND FILTER CARTRIDGE FOR AN OIL FILTER

(71) Applicant: Daimler AG, Stuttgart (DE)

(72) Inventors: Markus Sander, Stuttgart (DE); Lionel Le Clech, Stuttgart (DE); Eric Schumacher, Stuttgart (DE)

(73) Assignees: Daimler AG, Stuttgart (DE); Mercedes-Benz Group AG, Stuttgart (DE)

( * ) Notice: Subject to any disclaimer, the term of this patent is extended or adjusted under 35 U.S.C. 154(b) by 0 days.

(21) Appl. No.: 17/414,855

(22) PCT Filed: Nov. 5, 2019

(86) PCT No.: PCT/EP2019/080179
§ 371 (c)(1),
(2) Date: Jun. 16, 2021

(87) PCT Pub. No.: WO2020/126186
PCT Pub. Date: Jun. 25, 2020

(65) Prior Publication Data
US 2022/0018271 A1    Jan. 20, 2022

(30) Foreign Application Priority Data

Dec. 17, 2018    (DE) ..................... 10 2018 009 928.9

(51) Int. Cl.
*F01M 11/03*    (2006.01)
*B01D 29/21*    (2006.01)
(Continued)

(52) U.S. Cl.
CPC ............. *F01M 11/03* (2013.01); *B01D 29/21* (2013.01); *B01D 35/153* (2013.01); *F16N 39/06* (2013.01);
(Continued)

(58) Field of Classification Search
CPC ...... F01M 11/03; B01D 29/21; B01D 35/153; B01D 2201/0415; B01D 2201/295;
(Continued)

(56) References Cited

U.S. PATENT DOCUMENTS 3,076,335 A * 2/1963 Rosaen ................ B01D 35/147
73/198
3,294,238 A * 12/1966 Rosaen ................ B01D 35/147
210/90

(Continued)

FOREIGN PATENT DOCUMENTS

DE    10 2005 042 714 A1    3/2007
DE    10 2012 210 834 A1    1/2014
(Continued)

OTHER PUBLICATIONS

PCT/EP2019/080179, International Search Report dated Jan. 16, 2020 (Two (2) pages).

(Continued)

*Primary Examiner* — Kurt Philip Liethen
(74) *Attorney, Agent, or Firm* — Crowell & Moring LLP (57) ABSTRACT

An oil filter for a motor vehicle includes a filter cartridge disposed in an oil filter housing. A piston of the filter cartridge is displaceable in the oil filter housing in an axial direction of the filter cartridge. The filter cartridge has a closure element where the closure element is held at an end of at least one strut of the filter cartridge and where a free end of the at least one strut is supported in the oil filter housing. The piston is displaceable relative to the at least one strut in the axial direction of the filter cartridge.

16 Claims, 5 Drawing Sheets

(51) Int. Cl.
*B01D 35/153* (2006.01)
*F16N 39/06* (2006.01)

(52) U.S. Cl.
CPC ............... *B01D 2201/0415* (2013.01); *B01D 2201/295* (2013.01); *B01D 2201/305* (2013.01); *F16N 2039/065* (2013.01)

(58) Field of Classification Search
CPC .. B01D 2201/305; B01D 29/96; B01D 35/16; B01D 2201/4084; F16N 39/06; F16N 2039/065
See application file for complete search history.

(56) References Cited

U.S. PATENT DOCUMENTS

| | | | | |
|---|---|---|---|---|
| 4,204,965 A | * | 5/1980 | Vincent | F16N 39/06 210/447 |
| 5,300,223 A | * | 4/1994 | Wright | B01D 35/147 210/232 |
| 5,468,386 A | * | 11/1995 | Ardes | B01D 35/153 210/453 |
| 5,589,060 A | * | 12/1996 | Gebert | B01D 35/16 210/450 |
| 7,744,758 B2 | * | 6/2010 | Dworatzek | B01D 27/144 210/136 |
| 7,862,717 B2 | | 1/2011 | Pfitzer et al. | |
| 10,525,387 B2 | * | 1/2020 | Campbell | B01D 35/153 |
| 10,967,313 B2 | * | 4/2021 | Campbell | B01D 35/153 |
| 11,305,213 B2 | * | 4/2022 | Downs | B01D 27/144 |
| 2002/0020662 A1 | * | 2/2002 | Gottwarld-Grill | B01D 29/96 210/450 |
| 2018/0333664 A1 | * | 11/2018 | Sander | B01D 35/005 |
| 2019/0262751 A1 | | 8/2019 | Jainek | |

FOREIGN PATENT DOCUMENTS

| | | |
|---|---|---|
| DE | 10 2016 013 388 A1 | 5/2018 |
| EP | 1 949 950 A1 | 7/2008 |
| WO | WO 2017/050367 A1 | 3/2017 |
| WO | WO 2017/088962 A1 | 6/2017 |

OTHER PUBLICATIONS

German-language German Office Action issued in German application No. 10 2018 009 928.9 dated Nov. 19, 2019 (Five (5) pages).
Japanese Office Action issued in Japanese application No. 2021-535012 dated Jul. 26, 2022, with partial English translation (Six (6) pages).

* cited by examiner

OIL FILTER FOR A MOTOR VEHICLE AND FILTER CARTRIDGE FOR AN OIL FILTER

BACKGROUND AND SUMMARY OF THE INVENTION

The invention relates to an oil filter for a motor vehicle, with a filter cartridge which is arranged in an oil filter housing of the oil filter. The oil filter housing comprises a main body and a cover element. A piston of the filter cartridge comprises a channel for filtered oil, which is surrounded in the radial direction at least in some regions by a filter material of the filter cartridge, and an outlet port. The filter material is arranged between a first end plate and a second end plate of the piston. The piston is displaceable in the closed oil filter housing in an axial direction of the filter cartridge in order to prevent, in a closed position of the piston, an entry of filtered oil via at least one passage opening formed in the outlet port into a channel provided in the oil filter housing for supplying the internal combustion engine with lubricant, and to permit the entry in an open position of the piston. In the open position, the piston is distanced further from the cover element than in the closed position. The filter cartridge has a closure element by means of which a drain channel can be closed. The drain channel is designed for draining oil from a receiving region of the oil filter housing in which the filter cartridge is arranged. Furthermore, the invention relates to a filter cartridge for such an oil filter.

Such an oil filter is described in WO 2017/088962 A1. Here, the filter cartridge is floatingly mounted in the closed oil filter housing. When an internal combustion engine of the motor vehicle having the oil filter is not in operation, and thus no oil flows through the filter material of the filter cartridge, the filter cartridge is in the closed position. It is then not possible for any filtered oil to enter the channel provided in the oil filter housing for supplying the internal combustion engine with lubricant from passage openings formed in an outlet port of the channel of the filter cartridge. When the internal combustion engine is switched on, the filter cartridge is moved to the open position. In this case, the outlet port of the channel of the filter cartridge pushes a hood-shaped closing device away from a tubular receptacle of the main body of the oil filter housing against the force of a return valve spring. The outlet port projects into this tubular receptacle. By pushing the closure device away from its seat on the receptacle, the filtered oil can enter the channel provided in the oil filter housing via the passage openings formed in the outlet port. When the filter material is clogged, the filter cartridge is moved even further, towards a bypass position, and the tubular receptacle is moved away from its seat on a wall against the force of a bypass valve spring. Then, the unfiltered oil can enter the channel provided in the oil filter housing.

In the oil filter of WO 2017/088962 A1, the closure element on the filter cartridge is designed as a sleeve that can be displaced relative to the end plates and is pressed against an inlet of the drain channel by means of a third spring or service valve spring. In the event of servicing, the oil can be drained via the drain channel from the receiving region of the oil filter housing provided for the filter cartridge. The sleeve element pressed against the inlet of the drain channel by the force of the third spring thus provides the function of a service valve for the oil filter.

The third spring or compensation spring is dimensioned in such a way that the drain channel is closed in every position of the filter cartridge when the oil filter housing is closed. The compensation spring must therefore compensate for the stroke or the sliding movement of the filter cartridge and must always press a sealing element arranged on the sleeve against the drain at the bottom of the filter bowl or oil filter housing.

If this third spring or compensation spring is made of metal, complete incineration of the filter cartridge cannot be achieved when the filter cartridge is disposed of by burning. The filter cartridge is therefore not fully incinerable.

In addition, the force of the third spring or compensation spring or service valve spring must be overcome in addition to the force of the non-return valve spring and the bypass valve spring if the filter cartridge is to be moved into the open position or into the bypass position. For tolerance compensation, it must also be ensured already in the closed position of the filter cartridge that the third spring is compressed at least to such an extent that the closure element closes the drain channel when the oil filter housing is closed. Since the force of the third spring or service valve spring must always be overcome when the filter cartridge is moved into the open position and into the bypass position, the displacement of the filter cartridge in the closed oil filter housing is accompanied by a higher pressure loss than would be the case without the provision of the third spring or compensation spring.

Furthermore, a comparatively large amount of installation space must be provided for the sleeve element and the third spring, in addition to the installation space to be provided for the stroke of the filter cartridge. This means that the available filter area of the filter material is smaller than without the provision of the compensation spring and the sleeve or than would be the case with a filter cartridge arranged immovably in the oil filter housing. The object of the present invention is to provide an oil filter and a filter cartridge of the type mentioned above with a simplified structure.

The oil filter according to the invention for a motor vehicle comprises a filter cartridge which is arranged in an oil filter housing of the oil filter. The oil filter housing comprises a main body and a cover element. A piston of the filter cartridge comprises a channel for filtered oil and an outlet port. The channel of the piston is surrounded in the radial direction at least in some regions by a filter material of the filter cartridge. The filter material is arranged between a first end plate and a second end plate of the piston. The piston is displaceable in the closed oil filter housing in an axial direction of the filter cartridge in order to prevent, in a closed position of the piston, an entry of filtered oil into a channel provided in the oil filter housing via at least one passage opening formed in the outlet port. Furthermore, in the closed oil filter housing, the piston is displaceable in the axial direction of the filter cartridge to allow, in an open position of the piston, the entry of oil into the channel provided in the oil filter housing. In the open position of the piston, the piston is distanced further away from the cover element than in the closed position. The filter cartridge has a closure element by means of which a drain channel can be closed. The drain channel is designed to drain oil from a receiving region of the oil filter housing. The filter cartridge is arranged in the receiving region. The closure element is held on at least one strut of the filter cartridge, the free end of the strut being supported in the closed oil filter housing. The piston is displaceable relative to the at least one strut in the axial direction of the filter cartridge. By supporting the at least one strut in the oil filter housing, it is possible to press the closure element against an inlet of the drain channel by means of the at least one strut in such a way that the drain channel is always closed when the oil filter housing is closed. Thus, no spring needs to be provided on the filter cartridge to effect closure of the drain channel by means of the closure element. Accordingly, the construction of the oil filter and especially of the filter cartridge is simplified.

The closed position of the piston is a position of the piston of the filter cartridge, which the piston assumes in the closed oil filter housing when an internal combustion engine of the motor vehicle having the oil filter is switched off. The closed position of the piston can thus also be referred to as the engine-off position.

By contrast, the open position of the piston is a position of the piston in which a non-return valve in the oil filter housing is pressed open or opened by means of the outlet port of the filter cartridge. During operation of the oil filter, this is effected in that an oil pump of the motor vehicle having the oil filter delivers oil through the oil filter housing, which is thereby preferably cleaned by means of the filter material of the filter cartridge. Since the oil pump is usually driven by the running combustion engine of the motor vehicle, the open position of the piston can also be referred to as the engine-on position.

The displacement of the piston from the closed position to the open position is caused by the pressure conditions prevailing in the oil filter housing, which occur when the oil delivered by the oil pump flows through the oil filter housing and the filter cartridge arranged in the oil filter housing. The piston of the filter cartridge is thus mounted floatingly in the closed oil filter housing. The piston is also displaced from the closed position relative to the at least one strut into the open position due to the pressure conditions in the closed oil filter housing that prevail during operation of the oil pump. In this case, the drain channel provided in the oil filter housing is always closed when the oil filter housing is closed by the closure element held on the at least one strut of the filter cartridge, which closure element is supported against the oil filter housing by means of the strut.

The filter cartridge has fewer parts than is the case when the third spring, or service valve spring, is provided, which presses the sleeve against the inlet of the drain channel in the case of the oil filter of WO 2017/088962 A1. The omission of such a spring also reduces the pressure loss of the filter cartridge during operation of the oil filter. This is because the force applied by the service valve spring no longer needs to be overcome to move the piston of the filter cartridge. The lower pressure loss during operation of the oil filter, or of the filter cartridge, is accompanied by reduced fuel consumption during driving of the motor vehicle having the oil filter.

Furthermore, the at least one strut may be made of a combustible material, for example a plastics material. In this way, it is possible to dispose of the filter cartridge by complete combustion, i.e., by complete conversion to ash. The filter cartridge can therefore be provided as a completely incinerable component with particularly little effort.

In addition, it can be achieved that when the piston is displaced in the axial direction of the filter cartridge, any abrasion that may occur as a result of wear occurs on the dirty side of the filter cartridge, i.e., on the side of the oil to be filtered. In addition, the provision of at least one strut instead of the sleeve that can be displaced by means of the service valve spring makes it possible to provide an enlarged filter surface for the filter material of the filter cartridge, since there is no need to keep it free for the stroke path of the sleeve relative to the piston of the filter cartridge.

The piston of the filter cartridge, which comprises the filter material arranged between the first end plate and the second end plate, is movable relative to the at least one strut. Despite the displaceability of the piston, the closure element, which contains the service valve function of the filter cartridge, is provided with the filter cartridge itself. The closure element is held in position in a sealing manner against the drain channel by means of the at least one strut, which can be supported in the closed oil filter housing.

A particular advantage here is that the third spring, or compensation spring or service valve spring, described in WO 2017/088962 A1 can be completely omitted from the replaceable component in the form of the filter cartridge.

Preferably, the free end of the at least one strut in the closed oil filter housing is supported on the cover element of the oil filter housing. In this way, when the cover element is fixed to the main body of the oil filter housing, it can be ensured in a simple manner that the closure element is pressed against the drain channel or that the drain channel is closed by means of the closure element. Furthermore, supporting the free end of the at least one strut on the cover element also allows the filter cartridge to be removed easily for servicing, since the filter cartridge can be removed from the receiving region in the main body of the oil filter housing without further ado when the cover element is removed.

The filter cartridge according to the invention for an oil filter of a motor vehicle can be arranged in an oil filter housing of the oil filter comprising a main body and a cover element. A piston of the filter cartridge comprises a channel for filtered oil and an outlet port. The channel for filtered oil is surrounded in the radial direction at least in some regions by a filter material of the filter cartridge. The filter material is arranged between a first end plate and a second end plate of the piston. The piston is displaceable in the closed oil filter housing in an axial direction of the filter cartridge in order to prevent, in a closed position of the piston, an entry of filtered oil via at least one passage opening formed in the outlet port into a channel provided in the oil filter housing. Furthermore, the piston is displaceable in the closed oil filter housing in the axial direction of the filter cartridge in order to allow entry of the oil into the channel provided in the oil filter housing in an open position of the piston, in which the piston is distanced further away from the cover element than in the closed position. The filter cartridge has a closure element by means of which a drain channel can be closed. The drain channel is designed to drain oil from a receiving region of the oil filter housing, the receiving region being provided to receive the filter cartridge. The closure element is held on at least one strut of the filter cartridge, the free end of the at least one strut being supportable in the closed oil filter housing. The piston is displaceable relative to the at least one strut in the axial direction of the filter cartridge.

Such a filter cartridge has a particularly simple structure and ensures the function of a service valve by the closure element held by means of the at least one strut and supported in the closed oil filter housing. The present construction makes a metallic service valve spring superfluous. By means of the at least one strut, which can be supported in the oil filter housing and is connected to the closure element, the closure element can be reliably pressed against the drain channel in a sealing manner when the filter cartridge is installed in the oil filter housing.

Preferably, the free end of the at least one strut in the closed oil filter housing can be supported on the cover element of the oil filter housing. Supporting the free end of the at least one strut on the cover element allows, in particular, easy removal of the filter cartridge in the event of servicing, as the filter cartridge can be easily removed from the receiving region of the oil filter housing after removing the cover element from the main body of the oil filter housing.

It has been shown to be advantageous if the at least one strut is designed as a guide element for guiding the piston of the filter cartridge during displacement of the piston relative to the at least one strut. In this way, the functionality of the at least one strut is increased and, in addition, a process-safe displacement of the piston of the filter cartridge in the closed oil filter housing is achievable.

For example, the at least one strut may be guided in grooves formed in at least one of the end plates, or projections formed on the at least one end plate may engage in grooves formed in the at least one strut.

However, a particularly reliable guidance of the piston can be achieved if a passage opening is formed in at least one of the end plates, through which the at least one strut is guided. The at least one strut is then guided in a kind of eyelet which is formed in the at least one end plate.

The passage opening can be formed in a tab which protrudes in the radial direction over an edge of the at least one end plate. This ensures that the at least one strut runs outside the filter material of the filter cartridge. This means that the passage of oil to be filtered from the outside through the filter material into the channel of the filter cartridge is impaired to a particularly small extent. In addition, a very reliable guidance of the piston relative to the at least one strut can be achieved.

It has been shown to be further advantageous if the at least one strut has at least one guide region along which an end plate can be guided when the piston is displaced, the guide region being oriented substantially parallel to the axial direction of the filter cartridge. Due to the at least one straight guide region, a smooth and frictionless guiding of the piston of the filter cartridge can be achieved.

In particular, the at least one strut can be guided in the at least one guide region through the passage opening formed in at least one of the end plates of the filter cartridge. If the at least one strut is guided in various guide regions through corresponding passage openings formed in the first end plate and the second end plate, a particularly precise guiding of the filter area can be ensured.

In an advantageous refinement, the at least one strut has a further length region between a first guide region formed in the region of the first end plate and a second guide region formed in the region of the second end plate. In the further length region, the at least one strut is arc-shaped. In this way, manufacturing tolerances of the oil filter housing and/or the filter cartridge can be compensated for, and it can also be ensured that the closure element always closes the drain channel when the oil filter housing is closed. The curve of the at least one strut makes it easy to compensate for any tolerances of the oil filter housing and/or filter cartridge, so that when the oil filter housing is closed, the closure element is reliably subjected to a pressure that causes the drain channel to be sealed.

Preferably, the at least one strut is curved outwardly in the radial direction in the further length region. This ensures on the one hand that the at least one strut does not press against the filter material of the filter cartridge. If the at least one strut in the further length region is curved outwardly in the radial direction, the oil to be filtered can flow through the filter material unhindered in the radial direction from the outside to the inside. The at least one arc-shaped strut also counteracts collapse of the filter material. In addition, if there are a plurality of struts, these come into contact with the oil filter housing in the further length region, and thus an installation position of the filter cartridge in the oil filter housing can be defined particularly well.

In addition or alternatively to an arc-shaped design of the at least one strut, the at least one strut can have at least one spring region in which it can be compressed as a result of a force acting in the axial direction of the filter cartridge. Such a spring region also compensates for tolerances, in particular manufacturing tolerances, of the oil filter housing and/or the filter cartridge. Because of the provision of the spring region, in which a height extension of the at least one strut can be reduced, the closure element in the closed oil filter housing is always pressed against an inlet of the drain channel, even if tolerances of the oil filter housing and/or the filter cartridge are present.

The tolerance compensation, which can preferably be achieved by the arc-shaped design of the at least one strut and/or by the provision of the spring region, serves in particular to compensate for deviations of an actual distance between the cover element and the drain channel from a desired distance of this region, and/or to compensate for different lengths of the filter cartridge in the axial direction, which can be caused, for example, by production and/or by slightly different installation positions of the filter cartridge.

The at least one strut can advantageously have at least two legs arranged in a V-shape in the at least one spring region. In this case, spaced-apart ends of the legs can be moved towards each other as a result of the application of force. By means of such a defined bending region, which comprises the at least two legs, a spring region for compressing the height extension of the at least one strut can be provided in a very simple and reliable manner.

Preferably, the at least one spring region is formed in a portion of the at least one strut in which this strut protrudes over the one of the two end plates that is closer to the closure element. This is because it is easier to provide the spring region here in terms of the installation space.

Preferably, the end plate of the two end plates closer to the closure element has a recess surrounding the outlet port of the channel of the filter cartridge. Here, an inner wall of the recess is formed by the outlet port, and a filter material region of the filter material overlaps with an outer wall of the recess in the axial direction of the filter cartridge. Such a recess or inversion in the form of a groove in the region of the end plate closer to the closure element makes it possible to provide a particularly large filter area of the filter material while at the same time realising a displacement path of the floatingly mounted filter cartridge necessary for the opening of the non-return valve or the opening of the bypass valve in a given installation space available for the filter cartridge in the oil filter housing. This also ensures reliable central guidance of the filter cartridge by means of sufficient overlap of the outlet port of the filter cartridge with the tubular receptacle in the oil filter housing.

It is also advantageous if the at least one strut has at least one stop element in an end region, which stop element engages behind the end plate of the two end plates that is further away from the closure element. Such a stop element provides a stop for the displacement movement of the piston of the filter cartridge relative to the at least one strut. In addition, the at least one strut is thus arranged in a defined position relative to the end plate further away from the closure element. The stop element can be designed as a spring tongue or similar latching element.

Preferably, the filter cartridge has a plurality of struts distanced from one another in the circumferential direction of the end plates. In particular, the struts can be evenly distanced from each other in the circumferential direction. Thus, on the one hand, a homogeneous support of the closure element by means of the struts is achievable, which causes a reliable closure of the discharge channel. On the other hand, improved guidance of the piston of the filter cartridge can be achieved when displacing the piston relative to the struts.

In particular, the struts can have a rectangular shape in cross-section, at least in some regions. On the one hand, such struts, designed in the manner of narrow battens, are particularly robust, and, on the other hand, it is possible to arrange such struts on the filter cartridge in such a way that they require advantageously little installation space in the radial direction. Furthermore, the rectangular cross-section of the struts, the broad side of which faces the filter material of the filter cartridge, allows a direction to be specified in which the strut is to bend when it is subjected to a force acting in the axial direction of the filter cartridge. This ensures, for example, that the struts move away from the filter material when such a force is applied. In this way, contact of the struts with the filter material is prevented and good flowability of the filter material is ensured.

The advantages and preferred embodiments described for the oil filter according to the invention also apply to the filter cartridge according to the invention and vice versa.

Further advantages, features and details of the invention will become apparent from the following description of preferred embodiment examples and from the drawings. The features and combinations of features mentioned above in the description as well as the features and combinations of features mentioned below in the description of the figures and/or shown alone in the figures can be used not only in the combination indicated in each case, but also in other combinations or on their own, without departing from the scope of the invention.

DETAILED DESCRIPTION OF THE DRAWINGS

Figure 1:
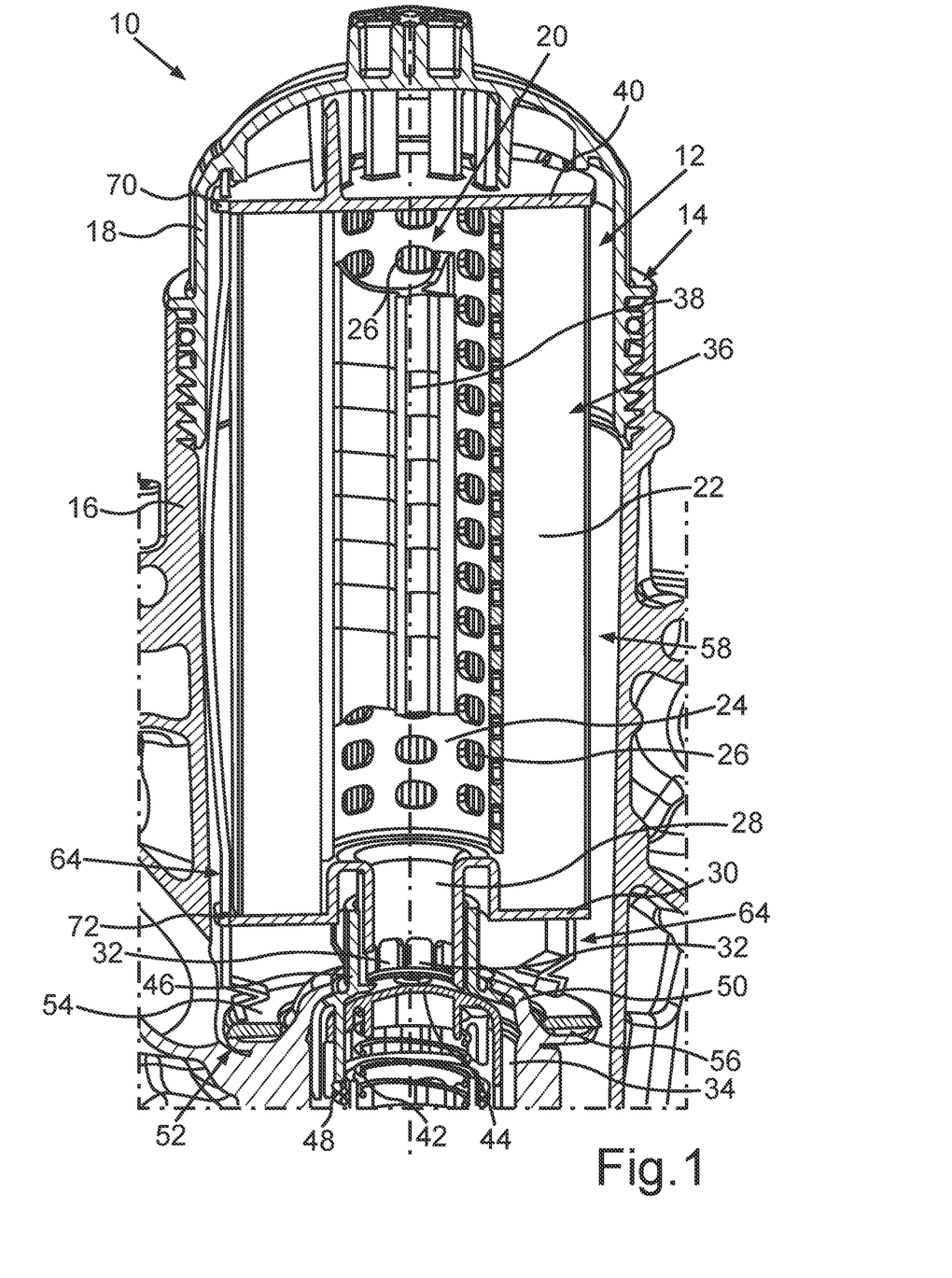
FIG. 1 shows, in a sectional perspective view, an oil filter for a motor vehicle, wherein a filter cartridge is installed in an oil filter housing of the oil filter.

FIG. 1 shows a sectional perspective view of an oil filter 10 for a motor vehicle, which may in particular be a commercial vehicle. A filter cartridge 12 of the oil filter 10 is also shown partially in section in FIG. 1. The oil filter 10 comprises an oil filter housing 14, which comprises a main body 16 and a cover 18, or rather a cover element. In order to change the filter cartridge 12, the cover 18 is dismantled, for example unscrewed, from the main body 16. In FIG. 1 the oil filter housing 14 is shown closed. The cover 18 with the filter cartridge 12 held on the cover 18 is thus screwed into the main body 16.

The filter cartridge 12 has a piston 36 with a channel 20. The channel 20 is radially surrounded by a filter material 22.

The filter material 22 can, for example, be formed as a pleated filter. The channel 20 comprises a central support tube 24 in which a plurality of passages 26 are formed. The oil filtered by means of the filter material 22 can enter the channel 20 via these passages 26. The unfiltered oil, which is located in the oil filter housing 14, thus passes through the filter material 22 in a radial direction from the outside and thus enters the channel 20, which is formed in the piston 36.

At an end of the filter cartridge 12 opposite the cover 18, the channel 20 of the filter cartridge 12 includes a tubular outlet port 28. This outlet port 28 may be integrally formed with a first end plate 30 of the piston 36 of the filter cartridge 12. A plurality of passage openings 32 are formed in the outlet port 28 of the channel 20. Through these passage openings 32, the filtered oil can exit the channel 20 and enter a channel 34 provided in the oil filter housing 14 for supplying lubricant to an internal combustion engine. This is possible when the piston 36 of the filter cartridge 12 is displaced in an axial direction 38 of the filter cartridge 12 sufficiently far away from the cover 18. The axial direction 38 is illustrated in FIG. 1 by a centre axis of the filter cartridge 12 or of the oil filter 10.

In FIG. 1, the piston 36 of the filter cartridge 12, which comprises the filter material 22 disposed between the first end plate 30 and a second end plate 40 of the piston 36, is shown in a closed position in which leakage of filtered oil from the passage openings 32 and corresponding entry of filtered oil into the channel 34 is prevented. In the closed position of the piston 36 shown in FIG. 1, an internal combustion engine of the motor vehicle is switched off. Accordingly, an oil pump (not shown) normally driven by the internal combustion engine does not deliver unfiltered oil into the oil filter housing 14. Consequently, no unfiltered oil is cleaned due to a flow through the filter material 22 of the filter cartridge 12. The closed position of the piston 36 can thus also be referred to as the engine-off position of the piston 36.

In an open position of the piston 36 (not shown here), the piston 36 is distanced further from the cover 18 in the oil filter housing 14. This displacement movement of the piston 36 of the filter cartridge 12 in the axial direction 38 from the closed position (see FIG. 1) to the open position within the closed oil filter housing 14 is caused by the pressure conditions prevailing in the oil filter housing 14 during operation of the oil filter 10. In fact, during operation of the internal combustion engine of the motor vehicle, the oil pump delivers the unfiltered oil into the oil filter housing 14. In particular, the pressure exerted by the unfiltered oil on the upper or second end plate 40, which is larger in area, is greater than the pressure exerted by the unfiltered oil on the lower or first end plate 30, which is smaller in area. Even taking into account the pressure loss that occurs when the oil to be filtered passes through the filter material 22, this pressure difference is sufficient to push a closure part 44 of the main body 16 away from a tubular receptacle 46 provided in the main body 16 by means of the outlet port 28, against the force of a non-return valve spring 42.

The open position of the piston 36 may also be referred to as the engine-on position of the piston 36, because when the internal combustion engine of the motor vehicle is running or switched on, or when the oil pump is in operation, the flow of oil through the oil filter housing 14 causes the piston 36 to move from the closed position to the open position.

As a result of the displacement movement of the piston 36 caused by the pressure conditions during operation of the oil filter 10, the piston 36 thus pushes the closure part 44 away from a valve seat provided on the tubular receptacle 46 by means of the outlet port 28 against the force of the non-return valve spring 42. As a result, in this (not shown) open position of the piston 36, the filtered oil can pass from the channel 20 into the channel 34 via the passage openings 32 formed in the outlet port 28.

If, with the internal combustion engine of the motor vehicle running, the filter material 22 is clogged to such an extent that the pressure loss when the unfiltered oil passes through the filter material 22 into the channel 20 is increased again, the piston 36 of the filter cartridge 12 moves even further away from the cover 18 in the axial direction 38 into a bypass position (also not shown). Here, against the force of a bypass valve spring 48, the tubular receptacle 46 is pushed by means of the piston 36 of the filter cartridge 12 away from a valve seat 50, which is also provided in the main body 16 in the oil filter housing 14. Thereupon, the unfiltered oil can pass directly into the channel 34.

For a detailed illustration and explanation of the interaction of the floatingly mounted piston 36 of the filter cartridge 12 and the pressure conditions with the closure or valve device arranged in the oil filter housing 14 in the vehicle, reference is also made at this juncture to the explanations in WO 2017/088962 A1, since the valve functions—non-return valve, bypass valve, service valve—are realised in the same way here as there; only the filter cartridge has changes compared to WO 2017/088962 A1.

In the present case, the piston 36 of the filter cartridge 12, which is movable in the axial direction 38 of the filter cartridge 12, provides both the function of a non-return valve and that of a bypass valve. In the open position of the piston 36, the non-return valve is open, and in the bypass position of the piston 36, the bypass valve is additionally also open.

In addition, a service valve 52 is integrated into the filter cartridge 12. For the service valve function, a drain channel 56, which is shown in section in FIG. 1, is closed by means of an annular closure element 54 of the filter cartridge 12, which closure element can be seen better in FIG. 2 and FIG. 3 than in FIG. 1. The drain channel 56 is formed in the oil filter housing 14. When the drain channel 56 is not closed by means of the closure element 54, oil can be drained from a receiving region 58 of the oil filter housing 14 via the drain channel 56. The filter cartridge 12 is arranged in the receiving region 58 when the oil filter housing 14 is closed.

Figure 2:
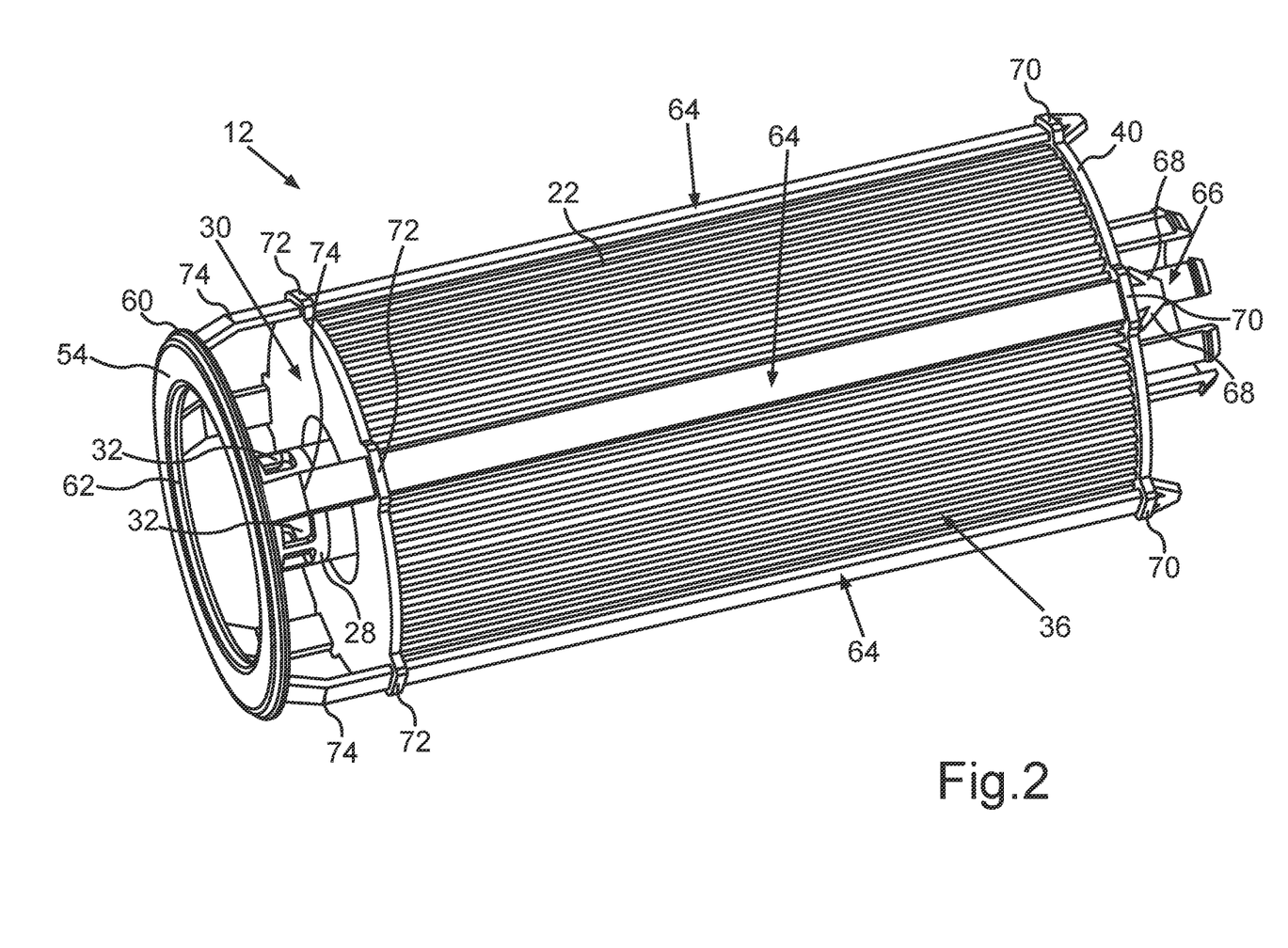
FIG. 2 shows, in a perspective view, a variant of the filter cartridge shown in section in FIG. 1.
Figure 3:
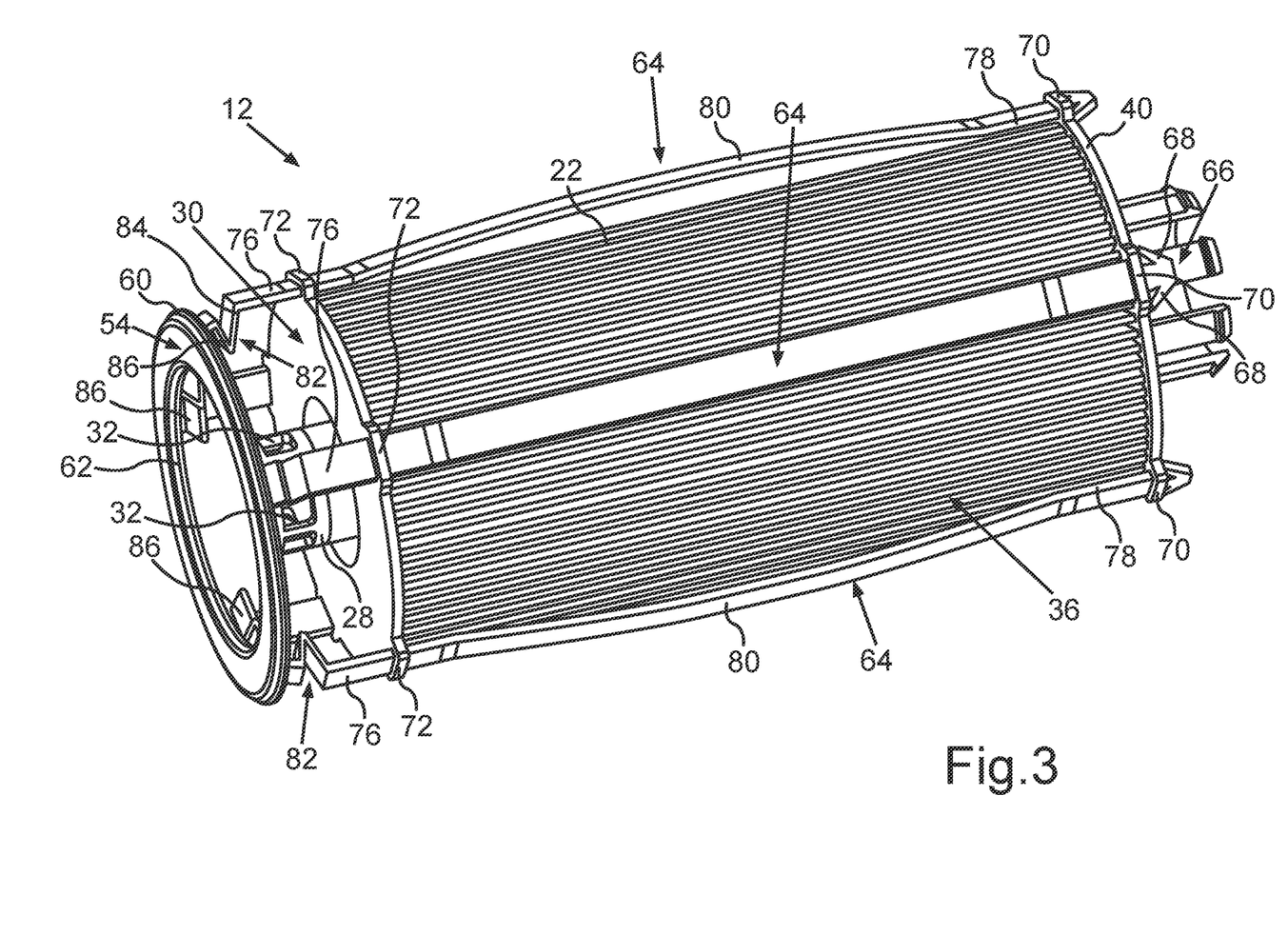
FIG. 3 shows, in a perspective view of the filter cartridge installed in the oil filter housing of the oil filter according to FIG. 1.

It is particularly clear from FIG. 2 and FIG. 3 that the closure element 54 can have an outer, in this case annular, seal 60 and a further, in this case likewise annular inner seal 62 for closing the drain channel 56. The seals 60, 62 can be brought into contact with corresponding regions of the drain channel 56 when the closure element 54 closes the drain channel 56, for example in the closure position of the piston 36 of the filter cartridge 12 shown in FIG. 1. However, the drain channel 56 is also closed by means of the closure element 54 in the (not shown) open position of the piston 36 and in the (also not shown) bypass position of the piston 36. Only when the cover 18 is removed from the main body 16 of the oil filter housing 14 and the filter cartridge 12 is removed from the oil filter housing 14 is the service valve 52 open, because the closure element 54 is then distanced from the drain channel 56. When the service valve 52 is open, oil can therefore pas from the receiving region 58 of the oil filter housing 14 into the drain channel 56.

In the present case, however, when moving the piston 36 of the filter cartridge 12 from the closed position shown in FIG. 1 into the above-described open position or engine-on position, in which the force of the non-return valve spring 42 must be overcome, and also into the bypass position, in which the force of the bypass valve spring 48 must additionally be overcome, a service valve spring does not additionally need to be compressed, as is the case in the embodiment of the floatingly mounted filter cartridge according to WO 2017/088962 A1.

In the case of the oil filter 10 described here, a plurality of struts 64 of the filter cartridge 12 (see FIG. 2 and FIG. 3) support the closure element 54 on the cover 18 of the oil filter housing 14 when the oil filter housing 14 is closed. For this purpose, the free ends of the struts 64, of which only two struts 64 are clearly visible in FIG. 1, project in the axial direction 38 both over the first end plate 30 and over the second end plate 40 of the piston 36.

Consequently, when the oil filter housing 14 is closed, and thus the cover 18 is secured to the main body 16, the struts 64 press the closure element 54 provided with the at least one seal 60, 62 against the drain channel 56 in such a way that a drain opening provided by the drain channel 56 is closed. In the present case, the struts 64 of the filter cartridge 12 are longer than the filter piston itself to allow them to be supported against the lid 18. However, other forms of support of the struts 64 in the main body 16 of the oil filter housing 14, or in its receptacle 58, are also conceivable, in which case the struts 64 can also be shorter than the length of the filter piston 36 and are also not guided on the second end plate 40.

Further details of the filter cartridge 12 will be explained with reference to the other figures. For example, it is readily apparent from FIG. 2 and FIG. 3 that the struts 64 have stop elements, for example in the form of resilient latching tongues 68, in their end regions 66 which are remote from the closure element 54 and via which the closure element 54 can thus be supported on the cover 18. These latching tongues 68 engage behind the end plate 40 remote from the closure element 54, i.e., the second end plate 40, in the region of tabs 70 which project in the radial direction over an edge of the second end plate 40. In addition, passage openings, in this case in the form of rectangular slots, are formed in these tabs 70, the struts 64 being guided in each case through the passage opening provided in the corresponding tab 70.

Analogously, there are further passage openings in the present case in the form of rectangular slots in further tabs 72, which project in a radial direction over an edge of the first end plate 30. The struts 64 are also guided through these passage openings. The struts 64 are thus designed as guide elements which facilitate the displacement movement of the piston 36 of the filter cartridge 12 in the axial direction 38. In the variant of the filter cartridge 12 according to FIG. 2, the struts 64 are substantially straight along the length of the piston 36. The struts 64 have a bend 74 in a portion in which a strut 64 protrudes beyond the first, lower end plate 30, which allows tolerance compensation between the struts 64 and the distance between the drain channel and the stop for the struts 64 in the cover 18.

In the variant of the filter cartridge 12 shown in FIG. 3, further measures are provided for tolerance compensation. These measures can also take into account manufacturing tolerances of the filter cartridge 12 with regard to the length of its struts 64 in the axial direction 38 and also manufacturing tolerances of the oil filter housing 14.

According to FIG. 3, the respective struts 64 have respective guide regions 76, 78 in which the struts 64 are oriented substantially in parallel to the axial direction 38 and are thus straight. The displacement movement of the piston 36 of the filter cartridge 12 relative to the struts 64 occurs in the guide regions 76, 78. The straight guide regions 76, 78 are therefore at least as long as a stroke or displacement movement of the piston required to realise the functions of the non-return valve and the bypass valve.

Between the first guide region 76 formed in the region of the first end plate 30 and the second guide region 78 formed in the region of the second end plate 40, each strut 64 has a further length region 80 in which the strut 64 is arc-shaped and in the present case is curved outwardly in the radial direction. This curved shape makes it particularly easy to provide tolerance compensation between the drain hole or drain channel 56 and the cover 18 or filter cover.

Additionally or alternatively, according to FIG. 3, each strut 64 can have spring regions 82 in the form of defined bend regions. In these spring regions 82, a length of a strut 64 can be reduced when force is applied to the struts 64 in the axial direction 38. On the one hand, therefore, the curve shape of the strut 64 in the length region 80 provides a compensation arc for tolerance compensation in assembly with the oil filter housing 14. However, for the purpose of such tolerance compensation, the defined bend region or spring region 82 can also be provided additionally or alternatively.

In the present case, the respective strut 64 has two legs 84, 86 at its end connected to the closure element 54 in the spring region 82, which form a V-shape. The two spaced-apart ends of the legs 84, 86 can be moved towards each other as a result of the application of force.

Figure 4:
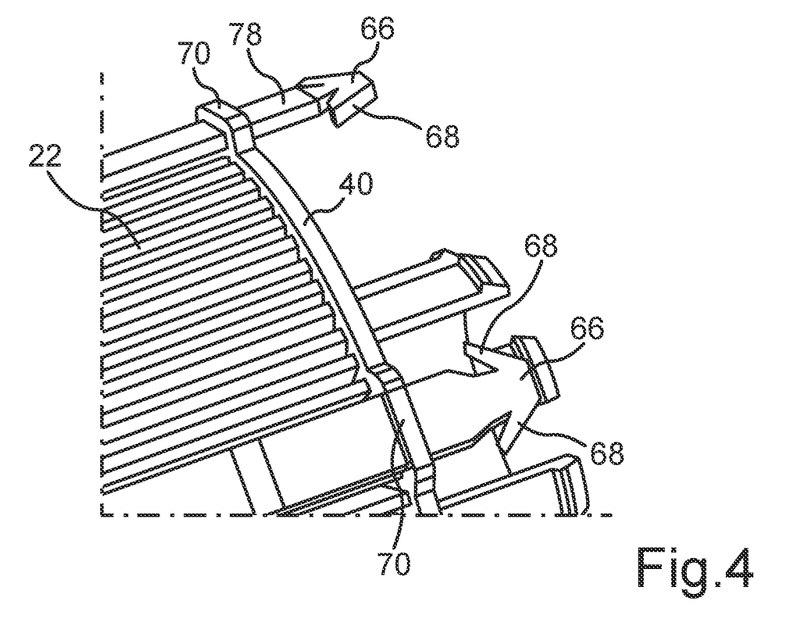
FIG. 4 shows a detail in a perspective view of an end region of the filter cartridge according to FIG. 3.

FIG. 4 shows how, when the piston 36 is displaced relative to the struts 64, the second guide region 78 at the free end of the strut 64 in the region of the second end plate 40 passes further through the passage openings formed in the tabs 70 of the second end plate 40, or emerges further from the passage openings, than is the case in the closed position, or engine-off position, of the piston 36 shown in FIG. 1 and in FIG. 3.

All the tolerance compensation measures described so far are ultimately based on designing the struts 64 in such a way that they can be compressed in their height extension when an axial force is applied.

Figure 5:
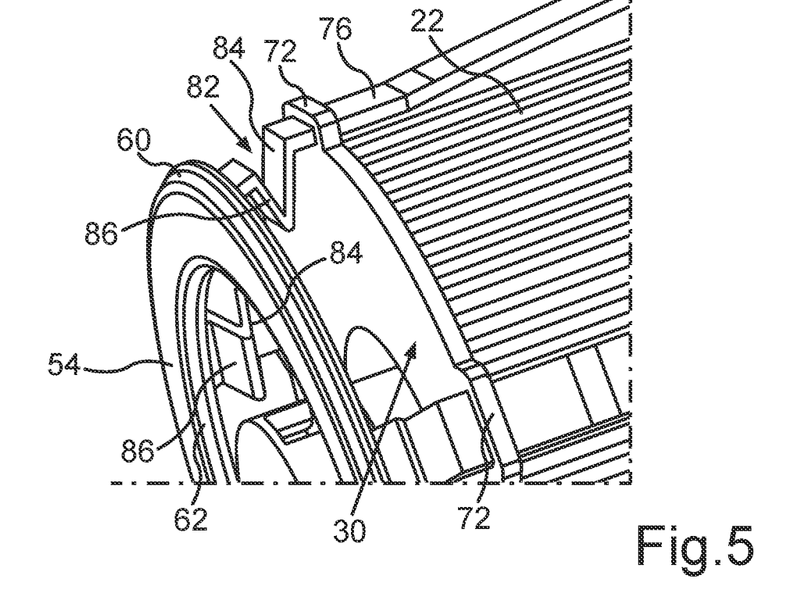
FIG. 5 shows a detail in a perspective view of the other end region of the filter cartridge according to FIG. 3.

It can also be seen from FIG. 5 that in the same situation, in which the piston 36 is distanced further from the cover 18 of the oil filter housing 14 than in the closed position of the piston 36 shown in FIG. 1, the first guide region 76—in the direction of the closure element 54—protrudes only a small distance in the axial direction 38 of the filter cartridge 12 beyond the first, lower end plate 30. The guiding of the piston 36 in the axial direction 38 of the filter cartridge 12 along the guide regions 76, 78, which pass through the passage openings formed in the tabs 70, 72, is thus readily apparent, in particular from a combined overview of FIG. 3 with FIG. 4 and FIG. 5. Furthermore, the V-shape of the two legs 84, 86 in the bend region or spring region 82 is clearly visible in FIG. 5.

Figure 6:
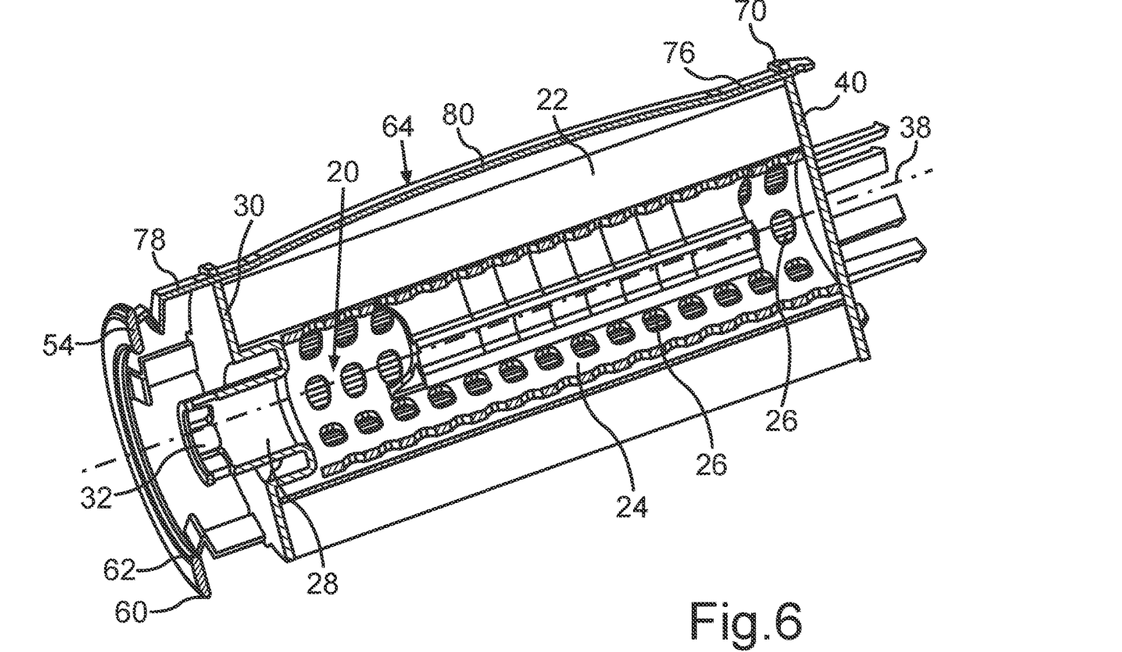
FIG. 6 shows the filter cartridge according to FIG. 3 in a further sectional perspective view.

The sectional view of the filter cartridge 12 in FIG. 6 shows in particular that a support body of the closure element 54 having the seals 60, 62 can be formed integrally with the struts 64. The seals 60, 62 are arranged on the annular support body.

Figure 7:
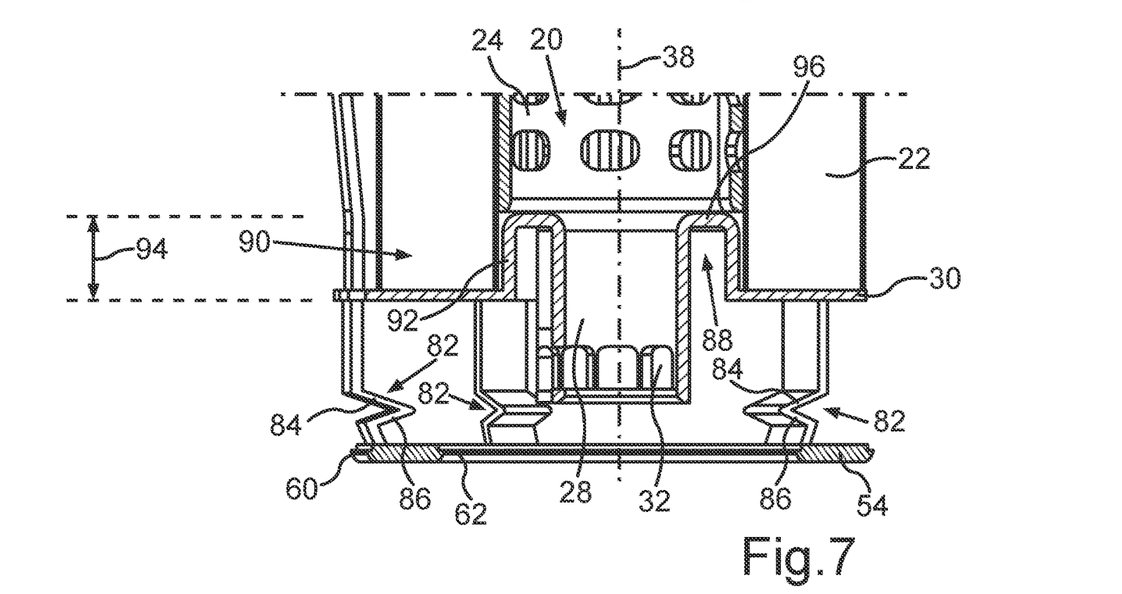
FIG. 7 shows the lower end region of the filter cartridge according to FIG. 3 in a sectional perspective view.

In particular, it can be seen from the enlarged detail view in FIG. 7 that a groove-like inversion or recess 88 is preferably formed in the first or lower end disc or end plate 30, which leads to an extension of the filter medium, or filter material 22, and thus to an increase in the available filter area with a constant displacement movement of the filter cartridge 12. The recess 88 runs around the outlet port 28 of the channel 20. An inner wall of the recess 88 is formed by the outlet port 28. A filter material region 90 of the filter material 22 overlaps in the axial direction 38 with an outer wall 92 of the recess 88.

Thus, the filter medium or filter material 22 is extended by a length 94 in the axial direction 38, illustrated by an arrow in FIG. 7, compared to a filter cartridge 12 in which the filter material 22 would only extend to a base 96 of the recess 88 or to an end of the outlet port 28 closer to the second end plate 40. The length 94 corresponds substantially to a depth of the groove-like recess 88.

Such a recess 88 or inversion in the form of a groove in the region of the end plate 30 closer to the closure element makes it possible to provide a particularly large filter area of the filter material 22 while maintaining the displacement path of the floatingly mounted filter cartridge 12 necessary for opening the non-return valve or opening the bypass valve in a given installation space available for the filter cartridge in the oil filter housing 14. Similarly, the recess 88 enables a reliable central guidance of the filter cartridge to be maintained by means of a sufficient overlap of the outlet port 28 of the filter cartridge 12 with the tubular receptacle 46 in the oil filter housing 14.

The invention claimed is:

1. An oil filter (10) for a motor vehicle, comprising:
an oil filter housing (14), wherein the oil filter housing (14) has a main body (16) and a cover element (18); and
a filter cartridge (12) disposed in the oil filter housing (14), wherein a piston (36) of the filter cartridge (12) has a channel (20) for filtered oil and an outlet port (28), wherein the channel (20) is surrounded in a radial direction at least in some regions by a filter material (22) of the filter cartridge (12), and wherein the filter material (22) is disposed between a first end plate (30) and a second end plate (40) of the piston (36);
wherein the piston (36) is displaceable in the oil filter housing (14) in an axial direction (38) of the filter cartridge (12) in order to prevent, in a closed position of the piston (36), an entry of filtered oil into a channel (34) provided in the oil filter housing (14) via a passage opening (32) formed in the outlet port (28), and, in an open position of the piston (36) in which the piston (36) is distanced further from the cover element (18) than in the closed position, to allow entry of oil into the channel (34) provided in the oil filter housing (14);
wherein the filter cartridge (12) has an annular closure element (54) via which an annular drain channel (56), which is configured to drain oil from a receiving region (58) of the oil filter housing (14) in which the filter cartridge (12) is disposed, is closable;
wherein the annular closure element (54) is held at an end of at least one strut (64) of the filter cartridge (12), wherein a free end of the at least one strut (64) is supported in the oil filter housing (14), and wherein the piston (36) is displaceable relative to the at least one strut (64) in the axial direction (38) of the filter cartridge (12).

2. The oil filter according to claim 1, wherein the free end of the at least one strut (64) is supported in the oil filter housing (14) on the cover element (18) of the oil filter housing (14).

3. A filter cartridge for an oil filter (10) of a motor vehicle, wherein the filter cartridge can be disposed in an oil filter housing (14) of the oil filter (10) and wherein the oil filter housing (14) has a main body (16) and a cover element (18), comprising:
a piston (36) that has a channel (20) for filtered oil and an outlet port (28), wherein the channel (20) is surrounded in a radial direction at least in some regions by a filter material (22) of the filter cartridge (12) and wherein the filter material (22) is disposed between a first end plate (30) and a second end plate (40) of the piston (36);

wherein the piston (36) is displaceable in the oil filter housing (14) in an axial direction (38) of the filter cartridge (12); and an annular closure element (54) via which an annular drain channel (56), which is configured to drain oil from a receiving region (58) of the oil filter housing (14) provided for receiving the filter cartridge (12), is closable;

wherein the annular closure element (54) is held at an end of at least one strut (64) of the filter cartridge (12), wherein a free end of the at least one strut (64) can be supported in the oil filter housing (14), and wherein the piston (36) is displaceable relative to the at least one strut (64) in the axial direction (38) of the filter cartridge (12).

4. The filter cartridge according to claim 3, wherein the free end of the at least one strut (64) can be supported on the cover element (18) of the oil filter housing (14).

5. The filter cartridge according to claim 3, wherein the at least one strut (64) is formed as a guide element for guiding the piston (36) during displacement of the piston (36) relative to the at least one strut (64).

6. The filter cartridge according to claim 3, wherein in at least one of the first and second end plates (30, 40), a passage opening is formed through which the at least one strut (64) passes.

7. The filter cartridge according to claim 6, wherein the passage opening is formed in a tab (70, 72) which projects in the radial direction beyond an edge of the respective at least one end plate (30, 40).

8. The filter cartridge according to claim 3, wherein the at least one strut (64) has guide regions (76, 78) along which the first and second end plates (30, 40) can be respectively guided during displacement of the piston (36) and wherein the guide regions are oriented parallel to the axial direction (38) of the filter cartridge (12).

9. The filter cartridge according to claim 3, wherein the at least one strut (64) has, between a first guide region (76) formed in a region of the first end plate (30) and a second guide region (78) formed in a region of the second end plate (40), a length region (80) in which the at least one strut (64) is arc-shaped.

10. The filter cartridge according to claim 9, wherein the at least one strut (64) in the length region (80) is curved outwardly in the radial direction.

11. The filter cartridge according to claim 3, wherein the at least one strut (64) has at least one spring region (82) in which the at least one strut (64) is compressible as a result of a force acting in the axial direction of the filter cartridge (12).

12. The filter cartridge according to claim 11, wherein the at least one strut (64) has at least two legs (84, 86) forming a V-shape in the at least one spring region (82) and wherein spaced-apart respective ends of the at least two legs (84, 86) are movable towards one another as a result of the force.

13. The filter cartridge according to claim 11, wherein the at least one spring region (82) is formed in a portion of the at least one strut (64) in which the at least one strut (64) protrudes beyond an end plate (30) of the first and second end plates (30, 40) which is closer to the closure element (54).

14. The filter cartridge according to claim 3, wherein an end plate (30) of the first and second end plates (30, 40) closer to the closure element (54), surrounding the outlet port (28) of the channel (20) of the filter cartridge (12), has a recess (88), wherein an inner wall of the recess (88) is formed by the outlet port (28), and wherein a filter material region (90) of the filter material (22) overlaps with an outer wall (92) of the recess (88) in the axial direction (38) of the filter cartridge (12).

15. The filter cartridge according to claim 3, wherein the at least one strut (64) has, in an end region (66), at least one stop element which engages behind an end plate (40) of the first and second end plates (30, 40) which is further away from the closure element (54).

16. The filter cartridge according to claim 3, wherein the filter cartridge (12) has a plurality of struts (64) spaced apart from one another in a circumferential direction of the first and second end plates (30, 40) and/or wherein the at least one strut (64) has a rectangular shape in cross section at least in regions.

* * * * *